(12) United States Patent
Bonte et al.

(10) Patent No.: US 6,380,290 B1
(45) Date of Patent: Apr. 30, 2002

(54) THERMOSTABLE SEGMENTED POLYETHERESTER COPOLYMER COMPOSITION

(75) Inventors: Geert I. V. Bonte, Diepenbeek (BE); Pieter Gijsman, Groot-Genhout (NL)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/694,301

(22) Filed: Oct. 24, 2000

Related U.S. Application Data

(63) Continuation of application No. PCT/NL99/00330, filed on May 27, 1999.

(30) Foreign Application Priority Data

May 29, 1998 (NL) .............................................. 1009287

(51) Int. Cl.⁷ .............................. C08K 5/16; C08K 5/54

(52) U.S. Cl. ........................ 524/198; 524/255; 524/257

(58) Field of Search ................................ 524/198, 257, 524/255

(56) References Cited

U.S. PATENT DOCUMENTS

| | | | | |
|---|---|---|---|---|
| 4,205,158 A | * | 5/1980 | Hoeschele | 528/300 |
| 4,277,391 A | | 7/1981 | Charles | |
| 4,520,148 A | * | 5/1985 | Golder | 524/100 |
| 4,778,839 A | | 10/1988 | Golder | |
| 5,260,387 A | | 11/1993 | Boundy et al. | |

FOREIGN PATENT DOCUMENTS

| | | |
|---|---|---|
| JP | 5721452 | 2/1982 |
| JP | 8151508 | 6/1996 |
| NL | 8403880 | 7/1993 |

\* cited by examiner

*Primary Examiner*—Kriellion A. Sanders
(74) *Attorney, Agent, or Firm*—Pillsbury Winthrop LLP

(57) ABSTRACT

The invention relates to a composition of a thermoplastic segmented polyetherester copolymer with a strongly improved thermooxidative stability, consisting of
1) a segmented polyetherester copolymer derived from terephthalic acid or naphthalene dicarboxylic acid, or an ester thereof, alkylene diol, polypropylene oxide glycol, which contains ethylene oxide end groups, and optionally a branching agent;
2) an effective amount of a stabilizer combination containing at least
   (2a) at least one thermooxidative stabilizer chosen from the group of phenolic antioxidants and
   (2b) at least one thermooxidative stabilizer chosen from the group of aromatic amines.
3) optionally other additives.

The composition is particularly suitable for application at high ambient temperatures and for applications in which the product obtained from the composition must over a long period be able to withstand deformations of at least 50% without fracturing and is in contact with metal.

9 Claims, No Drawings

THERMOSTABLE SEGMENTED POLYETHERESTER COPOLYMER COMPOSITION

This is a continuation of international application No. PCT/NL99/00330 filed May 27, 1999.

The invention relates to a segmented polyetherester copolymer composition with improved thermooxidative stability. Thermooxidatively stabilized compositions are known, inter alia, from U.S. Pat. No. 4,205,158, where is described a copolyetherester with hard segments, derived from the alkylene diol butane diol and terephthalic acid or an ester thereof, and with soft segments, derived from an alkylene oxide glycol, predominantly consisting of an ethylene oxide-capped glycol of polypropylene oxide. The thermooxidative stability is obtained through addition of one or more N,N'-alkylene bis(3,5-di-tert-butyl-4-hydroxy-hydrocinnamamides). In the above-mentioned publication use is made specifically of a combination of the hexamethylene-bis-(3,5-di-tert-butyl-4-hydroxy-hydrocinnamamide) and the trimethylene-bis-(3,5-di-tert-butyl-4-hydroxy-hydrocinnamamide). These compounds are commercially available under the tradenames Irganox® 1098 and 1019 of Ciba and are generally applied in the copolyetherester composition in a weight percentage of approximately 0.15/0.15. Such a combination is applied because especially the most active component, the Irganox® 1098, tends to bleed from the composition, which makes higher concentrations undesirable and in practice such higher concentrations also have a relatively small added stabilization effect on account of the bleeding. Commercially available copolyetherester compositions usually contain combinations of phenolic antioxidants on the basis of Irganox 1098®. Other examples of thermooxidative stabilizers and combinations thereof are given in the book Thermoplastic Elastomers, 2nd ed., pp. 212–213, (1996), Carl Hanser Verlag, ISBN 3-446-175983-8. Since, in particular in automotive applications, various parts are subjected to ever higher thermal loads and absolutely no concessions can be made with respect to the life of parts produced from thermoplastic polyetherester copolymer, there is a need for further improvement of the resistance of segmented copolyetheresters. Examples of such parts include so-called inboard boots and convoluted tubes. Requirements to be met by those are that the flexibility does not drop below a certain value over a very long period, i.e. the life of the vehicle. In general the parts must be able to withstand at least 50% deformation without fracturing.

Due to these higher requirements, copolyetherester compositions whose performance was satisfactory in the past can no longer meet the current requirements of supplying a stable copolyetherester composition that can withstand the higher thermal load.

The aim of the invention is therefore to provide a segmented polyetherester copolymer composition with an improved stability at elevated temperature.

The inventors have succeeded in achieving this aim with a copolymer composition containing:
1) a segmented polyetherester copolymer derived from terephthalic acid or naphthalene dicarboxylic acid or an ester thereof, an alkylene diol, polypropylene oxide glycol that contains ethylene oxide end groups on the polypropylene oxide segments, and optionally a branching agent;
2) an effective amount of a stabilizer combination containing at least
   (2a) at least one thermooxidative stabilizer chosen from the group of phenolic antioxidants and
   (2b) at least one thermooxidative stabilizer chosen from the group of aromatic amines;
3) optionally other additives.

Component (1) is a segmented polyetherester copolymer the hard segments of which are built up of repeating alkylene terephthalate or alkylene naphthalate units, for instance butylene or propylene terephtalate, and the soft segments of which are derived from a polyether polyol built up of propylene oxide units, the last unit or units of the polyalkylene oxide of the chain being ethylene oxide units. The ratio between the numbers of propylene oxide and ethylene oxide units may vary within a wide range, for example between 20:1 and 1:6, preferably between 10:1 and 1:1. The ratio between the soft segment content and the hard segment content is not critical, either, for the aim of the invention and may vary within such a range that the Shore D hardness of the segmented polyetherester elastomer generally lies between 75 and 25. The hard segments may optionally also contain a minor number of units derived from another aromatic dicarboxylic acid, for example isophthalic acid, but the content thereof should be limited to ensure that, among other things, the crystallization behaviour of the copolyetherester is not adversely affected.

The molar weight of the segments may vary within a wide range, but preferably the molar weight, $M_n$, of the soft segments is chosen between 300 and 4000, more preferably between 500 and 3000, and most preferably between 750 and 2500.

Chain branching may have been effected with the customary branching agents. Examples are described in, inter alia, U.S. Pat. No. 4,205,158. Trimellitic acid or trimellitic anhydride and trimethylol propane are preferred. The content of branching agent, if present, is chosen such that a desirable melt viscosity is obtained. In general, the branching agent content will not be higher than 6.0 equivalents per 160 moles of terephthalic acid (+any other aromatic dicarboxylic acid that is present), preferably lower than 3.0, and most preferably lower than 1.5 equivalents per 100 moles of terephthalic acid.

The amount of (2) may vary within a wide range, depending on the requirements, for example 0.2–5 wt. %, and is determined mainly by the desired stability level. For a high stability a content of (2) of at least 0.5 wt. %, relative to the copolyetherester, is preferred, while maximum stability is obtained at a content of at least 1.5 wt. %, after which a further increase in the content has only a marginal effect. In general, the fraction of (2a) in (2) is smaller than the fraction of (2b). Particularly when (2a) has a tendency to bleed from the de composition, a relatively small fraction of (2a) is to be used.

The above does not imply that compositions with a content of (2) that is lower than 0.5 wt. % are not within the scope of protection of the present patent application. Besides the components (1) and (2) as already defined, the composition may contain yet other additives, for example UV stabilizers, thermooxidative stabilizers that are active via a different mechanism, for example an organic phosphorus compound or thio compound, colourants, carbon black, processing aids, for example release agents, fillers, etc.

The composition of the invention finds application in particular in objects that are subjected to frequent dimensional changes at elevated temperature. Examples include bellows used to seal universal joints in automobiles, bellows for shielding of spring systems, convoluted tubes, gaskets, etc.

Such objects made from the composition according to the invention form also part of the present invention.

The objects according to the invention can be obtained using the customary methods, for example injection moulding, compression moulding and blow moulding. Both the technology of injection moulding and that of extrusion blow moulding can be used with good results. The composition according to the invention is suitable in particular for blow moulding.

The choice of the molar weight and the degree of branching of (1) depend on the desired application and the processing technique required therefor. In general, the melt flow index (MFI) will be between 0.5 and 50 gr/10 min., with higher MFI values generally being required for injection moulding applications than for extrusion. For blow moulding a low MFI is necessary.

Examples of components (2a) and (2b), of which the activity in segmented polyether ester copolymers is described in the already cited book Thermoplastic Elastomers and the references therein, include:

(2a) phenolic antioxidants, more in particular hindered phenols:
- 2.6-di-tert-butyl-4-methylphenol known, inter alia, under the tradenames Ionol of Shell, Naugard® BHT of Uniroyal and Ultranox 226 of General Electrics;
- 2.6-di-tert-butyl-4-ethylphenol, Ethyl® 724 of Ethyl Corp;
- 2.2'-methylene-bis-(6-tert-butyl-4-methylphenol), the tradenames including Antioxidant BKF of Bayer, Oxichek 114 of Ferro and Ultranox 246 of General Electrics;
- 1,3,5-trimethyl-2,4,6-tris-(3,5-di-tert-butyl-4-hydroxyphenyl) propionate, inter alia Anox® 20 of Great Lakes and Irganox® 1330 of Ciba-Geigy; N.N'-hexamethylene-bis-(3,5-di-tert-butyl-4-hydroxy-hydro-cinnamamide) the Irganox® 1098 of Ciba-Geigy;
- 2.2'-oxamido-bis-ethyl-3-(3,5-di-tert-butyl-4-hydroxyfenyl)-propionate), Naugard® XL1 of Uniroyal Chemical;
- 1,3,5-tris(3',5'-di-t-butyl-4'-hydroxybenzyl)-s-triazine-2,4,6-(1H,3H,5H)trione, Irganox® 3114, Ciba-Geigy;
- 1,3,5-tri(4-t-butyl-2,6-dimethyl-3-hydroxy-benzyl)-isocyanurate, Cyanox® 1790 of Cytec; tetrakis [methylene (3,5-di-t-butyl-4-hydroxyhydrocinnamate)] methane, Irganox® 1010 of Ciba-Geigy;
- 2,2'-ethylidene bis (4,6-di-t-butylphenol), Isonox® 129 of Schenectady Chemicals;
- 2-propylene carboxylic acid, 2-idopentane 6[(3-isopentane-2-hydroxy-5-isopentane-phenyl)-ethyl]-4-methyl-phenyl-ester, Sumilizer® GS of Sumitomo;
- p-cresol/dicyclopentadiene butylated reaction product, Ralox® LC of Raschig;
- N,N'-1,3-propane diylbis(3,5-di-t-butyl-4-hydroxyhydrocinnamamide);

(2b) aromatic amines
- 4.4'-di-cumyl-di-phenyl-amine, inter alia known under the tradename Naugard® 445 of Uniroyal Chemical;
- N,N'-di-phenyl-p-phenylene-di-amine, inter alia Permanex® DPPD of Vulnax;
- 4,4'-di-octyl-di-phenyl-amine, inter alia Vanox® 12 of R T Vanderbilt;
- N,N'-di-sec-butyl-p-phenylene-diamine, inter alia AO 22® of Dupont de Nemours or Topanol® M of ICI;
- N,N'-diphenylamine, Naugard® J of Uniroyal Chem;
- poly-(2,2,4-trimethyl-1,2-dihydro-quinoline), Flectol® H of Monsanto.

The activity of both the phenolic antioxidants and the aromatic amines resides in their function of free radical scavenger. In view of this a more obvious solution would be, as also stated in the reference of Thermoplastic Elastomers, to choose a combination of stabilizers with different functions. An optimum result can for example be expected from the combination of a free radical scavenger, a hydroperoxide decomposer and optionally also a formaldehyde scavenger.

It is, therefore, very surprising that the combination of a phenolic antioxidant and an aromatic amine has such a very great effect on the thermooxidative stability of the segmented copolyetherester, this combination having this great effect only for the copolyetherester defined under component 1.

The invention will now be elucidated on the basis of the following examples and comparative experiments. The indicated amounts of stabilizer were incorporated in the melt in the stated polyetherester. The polyetheresters were prepared using the method described in, inter alia, Thermoplastic Elastomers, 2nd ed., pp. 195–197, (1996) Carl Hanser Verlag, and the references given there, in the presence of 0.02 wt. % Irganox® 1098, and are as such commercially available.

Test rods for ISO tensile tests are kept in a hot-air oven at three temperatures, viz. 135° C., 120° C. and 105° C., and after different time intervals the elongation at break is measured on a number of samples.

EXPERIMENT I

In a first experiment a series of polyetheresters of differing hardnesses and compositions and stabilized with two types of phenolic antioxidants according to the state of the art were tested. Table 1 presents the different polyetherester copolymers and the stabilizers used, as well as the time after which the elongation at break (e.a.b.) has decreased to half of the initial value.

TABLE 1

| polyether ester | I 1330 [wt. %] | I 1098 [wt. %] | e.a.b [%] | t½, 135° C. [hours] | 120° C. | 105° C. |
|---|---|---|---|---|---|---|
| EM 460 | 0.5 | | 1250 | 45 | 205 | 975 |
| EL 550 | 0.5 | | 870 | 100 | 455 | 1960 |
| EL 740 | 0.5 | | 550 | 425 | 1525 | >4000 |
| PL 380 | 0.5 | | 980 | 80 | 320 | 1450 |
| PL 580 | 0.05 | | 283 | 11 | 45 | 225 |
| PL 580 | 0.5 | | 437 | 180 | 725 | 2850 |
| PL 580 | | 0.05 | 320 | 7 | 35 | 150 |
| PL 580 | | 0.5 | 356 | 280 | 2150 | >4000 |
| PL 720 | 0.5 | | 420 | 370 | 1900 | >4000 |

EM 460 is a copolyetherester on the basis of polytetrahydrofuran and PBT with a Shore D hardness = 45, available under the tradename Arnitel © EM 460 from DSM, The Netherlands.
EL 550 like EM 460, but with a Shore D hardness = 55, available under the tradename Arnitel © EL 550 from DSM.
EL 740 like EM 460, but with a Shore D hardness = 74, available under the tradename Arnitel © EL 740 from DSM.
PL 380 is a copolyetherester on the basis of ethylene oxide-capped polypropylene oxide and polybutylene terephthalate, with a Shore D hardness = 38, available under the tradename Arnitel © PL 380 from DSM.
PL 580 like PL 380, but with a Shore D hardness = 58, available under the tradename Arnitel © PL 580 from DSM.
PL 720 Like PL 380, but with a Shore D hardness = 72, available under the tradename Arnitel © EL 720 from DSM.
I 1330 is Irganox 1330 ® from Ciba-Geigy, Switzerland.
I 1098 is Irganox 1098 ® from Ciba-Geigy.

These experiments prove that the softer copolyetheresters, i.e. the copolymers with a higher content of soft segments, are less stable than the harder ones. Irganox® 1098 seems to be somewhat more effective than Irganox® 1330. However, the samples with Irganox® 1098 exhibit surface stains caused by bleeding of the Irganox® 1098, which for this reason cannot be used in practice at contents higher than about 0.25 wt. %. A similar phenomenon, though to a lesser degree, is found in Irganox® 1330.

The copolyetherester with polytetramethylene oxide as soft segment seems somewhat less stable than the comparable (same hardness) copolyetherester on the basis of polypropylene oxide. However, the differences are small and if a residual e.a.b. of 50% were to be used as standard for the life time they are negligible.

It is also evident that ageing is insufficiently inhibited at 135°.

EXPERIMENT II

In a second experiment a number of stabilizers were tested to determine the effect of their concentrations on the elongation at break for two copolyetheresters upon ageing at 135° C. The following samples were made and tested:
Samples 1–2: Arnitel® EM400+Irganox® 1330 (0.5 and 1.0 wt. %, respectively)
Samples 3–5: Arnitel® EM400+Irganox® 1098 (0.25, 0.50 and 1.0 wt. %)
Samples 6–7: Arnitel® PL580+Irganox® 1330 (0.50 and 1.0 wt. %)
Samples 8–10: Arnitel® PL580+Irganox® 1098 (0.25, 0.50 and 1.0 wt. %)

Comparing the elongation at break (in %) as a function of time proves that the activity of the phenolic stabilizers in the Arnitel® E samples does not increase with the stabilizer concentration. Such a relationship between effectiveness and concentration does appear to exist in the polypropylene oxide based Arnitel® P. With the Irganox® 1330, however, it is to be expected that use is to be made of very high concentrations to be able to realize a sufficiently high elongation at break for a sufficiently long time. However, high concentrations of phenolic stabilizer have a highly adverse effect on the colour and give rise to bleeding, and should therefore be avoided. The Irganox® 1098 is much more effective and about 1% of it in the composition would provide a sufficiently high stability for most cases. On account of the so-called bleeding effect, however, Irganox® 1098 can generally not be used in concentrations higher than about 0.25 wt. %.

It was subsequently investigated whether the activity of the phenolic antioxidant can be improved through the use of costabilizers.

EXPERIMENT III 0.5 wt. % Irganox® 1098 and 0.5 wt. % of a second stabilizer were added to Arnitel® EM400, after which the thermooxidative stability at 120° C. was determined as the change in the elongation at break of exposed test bars. As second stabilizer were added Naugard® 445, Sumilizer® TDP, a thiosynergist, penta-aerithrytol-tetrakis-(3-lauryl-thio-di-propionate), PEP 36®, an organic phosphite, bis-(2,6-di-t-butyl-4-methyl-phenyl)-penta- aerithrytoldiphosphite from ADEKA Argus, and additional 0.5 wt. % Irganox® 1098. Addition of the costabilizers prolongs the life, but none of the costabilizers used is as effective as or better than Irganox® 1098. Aromatic amine Naugard® 445 has the smallest effect.

EXPERIMENT IV

Varying amounts of Naugard® 445 (0, 0.25, 0.50 and 1.0 and 2.0 wt. %) were added to Arnitel® EM 400 with a basic content of 0.25 wt. % Irganox® 1098. Of these compositions the ageing at 135° C. was measured.

The sample without Naugard® 445 proved to lose all of its mechanical strength after about 8 to 9 days. For all samples to which Naugard® 445 had also been added this did not appear to occur until after about 14 days, with an increase in the aromatic amine content having, if anything, a negative effect on the development of the elongation at break. Replacement of Irganox® 1098 by Naugard® 445 did therefore not result in any significant prolongation of the lifetime.

EXPERIMENT V

The same amounts of Naugard® 445 as in the case of EM 400 (Exp. IV) were added to Arnitel® PM 580 with the same basic content of 0.25 wt. % Irganox® 1098, and the lifetime at 135° C. was determined, measured as the half-life value for the elongation at break. In a comparative experiment the effect of Naugard® 445 on Arnitel® PM 580 in the absence of a phenolic stabilizer was determined. The results are given in Table 2.

TABLE 2

| Irganox ® 1098 content [wt. %] | 0.25 | 0.25 | 0.25 | 0.25 | 0.25 | 0 | 1.0 |
|---|---|---|---|---|---|---|---|
| Naugard ® 445 [wt. %] | 0 | 0.25 | 0.50 | 1.0 | 2.0 | 1.0 | 0 |
| half-value time, e.a.b. [days] | 8 | 30 | 50–60 | 50–60 | 35–40 | 25 | 35 |

In contrast to Arnitel® EM, in Arnitel® PM a strongly synergistic effect occurs.

EXPERIMENT VI

The ageing of a number of the preceding compositions was tested at 135° C., the test specimens being kept in contact with a copper plate on one side during their exposure in the hot-air oven. End of life=moment that the elongation at break is ≦50%. From the results obtained the particularly advantageous effect of the combination of a phenolic compound and an aromatic amine as stabilizer, compared to the effect of the individual stabilizers on ageing is apparent for the frequently occurring situation of the thermoplastic elastomer being in contact with metal.

TABLE 3

| Arnitel © PM 580 | | | | | | | | | |
|---|---|---|---|---|---|---|---|---|---|
| Irg 1330 [wt. %] | 0 | 0.25 | | | | | | 0.50 | 0.25 |
| 1098 [wt. %] | 0 | | 0.50 | | | | 0.50 | 0.27 | |
| Naugard ® 445 [wt. %] | 0 | | | 1.00 | | 1.00 | 1.00 | 0.50 | 1.00 | 1.00 |
| Naugard ® XL 1 [wt. %] | 0 | | | | 0.25 | 0.50 | | | 0.25 |
| residual elong. 50% [days] | 12*) | 6 | 32 | 31 | | | <50 | <50 | 40 | 40 |
| + copper | 8*) | <2 | 10 | 17 | 10 | 26 | 40 | 35 | 28 | 31 |

*)hours

What is claimed is:
1. Thermooxidatively stabilized, segmented polyester copolymer composition containing:
1) a segmented polyester copolymer derived from terephthalic acid or naphthalene dicarboxylic acid or an ester thereof, an alkylene diol, polypropylene oxide glycol, which contains ethylene oxide end groups on the propylene oxide segments, and optionally a branching agent;
2) an effective amount of a stabilizer combination containing at least
   (2a) at least one thermooxidative stabilizer chosen from the group of phenolic antioxidants and

(2b) at least one thermooxidative stabilizer chosen from the group of aromatic amines selected from the group consisting from 4,4"-di-cumyl-diphenylamine, N,N'-diphenyl-p-phenylene-diamine, 4,4'-di-octyl-diphenylamine, N,N'-di-sec-butyl-p-phenylene-diamine, N,N'-diphenylamine and poly-(2,2,4-trimethyl-1,2-dihydro-quinoline);

3) optionally other additives.

2. Composition according to claim 1, wherein the phenolic antioxidant has been chosen from the group of N,N'-hexamethylene-bis-(3,5-di-tert-butyl-4-hydroxy-hydro-cinnamamide), 2,2'-oxamido-bis-(ethyl-3-(3,5-di-tert-butyl-4-hydroxy-fenyl)-propionate) and N,N'-1,3-propane-diylbis (3,5-di-tert-butyl-hydroxy-hydro-cinnamamide).

3. Composition according to claim 2, wherein the phenolic antioxidant is N,N'-hexamethylene-bis-(3,5-di-tert-butyl-4-hydroxy-hydro-cinnamamide).

4. Composition according to claim 3, wherein the aromatic amine is 4,4'-di-cumyl-diphenylamine.

5. Composition according to claim 1, wherein the ratio between the numbers of propylene oxide and ethylene oxide units in the segmented polyetherester copolymer lies between 20:1 and 1:6, preferably between 10:1 and 1:1.

6. Composition according to claim 1, wherein the Shore D hardness of the segmented polyetherester copolymer is between 75 and 25.

7. Composition according to claim 1, wherein the content of (2) is between 0.2 and 5 wt. %, preferably 0.5 and 1.5 wt. %.

8. Composition according to claim 4, characterized in that the content of (2) is between 0.5 and 1.5 wt. %.

9. An article of manufacture comprising the composition according to claim 1.

* * * * *